March 15, 1938. W. G. PANKONIN 2,111,404
STAPLE
Filed Sept. 5, 1935
   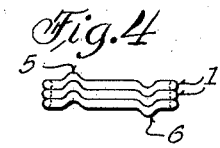
  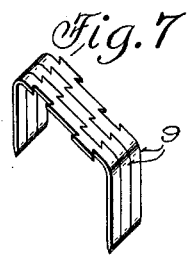 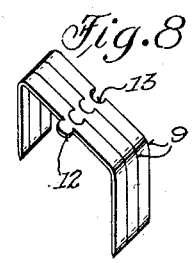
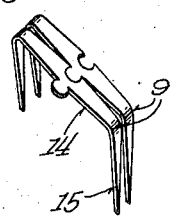 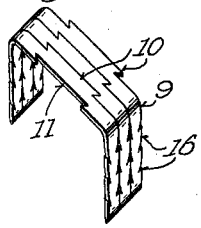  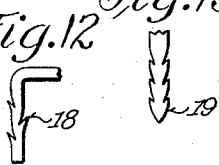
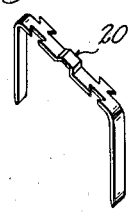 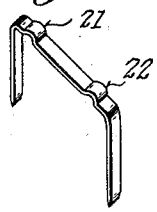 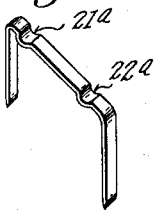 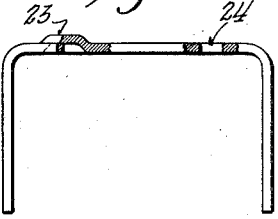
   
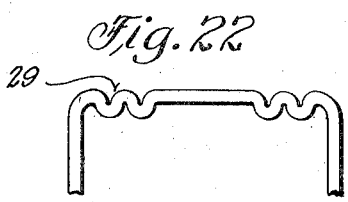
INVENTOR.
WILLIAM G. PANKONIN
BY Bottum, Hudnall, Lecher,
McNamara & Michael
ATTORNEYS Patented Mar. 15, 1938

2,111,404

UNITED STATES PATENT OFFICE 2,111,404

STAPLE

William G. Pankonin, Chicago, Ill.

Application September 5, 1935, Serial No. 39,247

2 Claims. (Cl. 85—49)

This invention relates to improvements in preformed staples of the type which are generally assembled in strip formation or clips and inserted as a unit into the magazine of stapling or tacking machines.

The present application is a continuation in part of the co-pending applications of this applicant, Serial No. 653,985, filed January 28, 1933, for Stapling machines, issued December 29, 1936, as Patent No. 2,066,157, and Serial No. 748,803, filed October 18, 1934, for Stapling devices.

One of the objects of this invention is to provide a staple having a bridge portion of improved shape to permit of more steady engagement of said bridge portion with a staple driving tool and to aid in maintaining a series of such staples in strip formation.

Another object is to provide a staple with improved shape providing integral means for locking a series of such staples in strip formation.

Another object is to provide a staple having legs of improved shape to aid in retarding the removal of the staple from material.

Another object is to provide a staple with an improved shape designed to prevent its use except in machines especially provided therefor.

A still further object is to provide a staple with an improved bridge portion designed to resist the buckling thereof during the driving and clinching of the staple.

Other objects and advantages reside in certain novel features of construction, arrangement and combination of parts which will be hereinafter more fully described and particularly pointed out in the appended claims, reference being had to the accompanying drawing forming a part of this specification and in which:

Figure 1 is a view in front elevation of a staple having a single laterally projecting deformation in the bridge thereof;

Fig. 2 is a top plan view of a group of staples assembled in strip formation, each staple having single laterally projecting deformations in the bridge thereof as illustrated in Fig. 1;

Fig. 3 is a top plan view of a group of staples assembled in strip formation, each staple having series of laterally projecting deformations in the bridge thereof;

Fig. 4 is a top plan view of a group of staples assembled in strip formation, each staple having laterally and oppositely projecting deformations symmetrically positioned in the bridge thereof;

Fig. 5 is a top plan view of a group of staples assembled in strip formation, each staple having its bridge formed laterally in an arcuate shape;

Fig. 6 is a view similar to Fig. 5 and in which the formation of the bridge of each staple provides for a clearance space between adjacent staples;

Fig. 7 is a perspective view of a group of staples assembled in strip formation, each staple having lugs and slots of dovetail shape symmetrically arranged and adapted to interfit with similar lugs and slots of adjacent staples;

Fig. 8 is a view similar to Fig. 7, each staple having arcuate tabs and slots;

Fig. 9 is a view similar to Fig. 8, the bridge and legs of each staple being tapered;

Fig. 10 is a view similar to Fig. 7, the legs of each staple being serrated or barbed;

Figs. 11, 12, and 13 are views in fragmentary elevation of staple legs that are deformed, barbed or notched to prevent ready retraction;

Figs. 14, 15, and 16 are views in perspective of staples having vertically projecting deformities in the bridges thereof;

Fig. 17 is an enlarged view in side elevation of a staple having a raised portion on one end and an apertured or dented portion at the other of the bridge thereof, parts being shown in section for the sake of illustration;

Figs. 18, 19, 20, and 21 are views in side elevation of staples having one or more notches or teeth formed in or raised from the bridge thereof; and Fig. 22 is an enlarged view in side elevation of a staple having the bridge portion deformed to provide dentation and protrusions on the upper and lower surfaces thereof.

To provide for convenient loading of the magazines of stapling machines and ease in handling, packing and shipping of staples, the conventional practice is to assemble a series of individual staples in row formation or clips. The staples are assembled contiguously with their respective bridge portions and legs in alignment and a layer or film of adhesive applied to the clip thus formed to secure the staples in assembled position. In many instances, the film adhesive has not proved adequate to maintain the staples thus assembled. In order to aid the adhesive in the performance of its function or to eliminate the adhesive entirely, this invention provides a special formation of the bridge portion of the staple.

Referring now to the embodiments of the present invention as illustrated in Figs. 1 to 6, inclusive, 1 indicates a wire staple having a horizontal portion forming the bridge and depending spaced vertical portions forming the legs. The staple 1 may be formed from round stock (see Fig. 4) or square stock. It is sometimes preferable to use round stock which has been slightly flattened on opposite sides before the legs are formed. The bridge of the staple 1 is provided with a laterally projecting centrally located knob-like deformation 2. The deformation 2 has a portion projecting from one side of the bridge and a portion defining a recess in the other side of the bridge. With a series of staples assembled so that the forward side of one is adjacent the rearward side of the next contiguously located staple, a row formation or clip is formed to which adhesive can be applied to retain the staples thus assembled. The projecting portion on one staple fits into the recessed portion of the adjacent staple. This interfitting relationship aids in preventing the staples from moving laterally with respect to each other and tends to constrain them in the row formation and to remove part of the strain placed on the adhesive binder.

Instead of forming a single knob-like projection in the bridge of the staple, the bridge may be laterally deformed to provide a series of wave-like projections and corresponding recesses as indicated at 3 and 4, Fig. 3. The wave-like projections of one staple, when a series is formed as previously described, fit into the recesses of an adjacent staple when the staples are assembled in row formation.

By laterally deforming the bridge of the staple so that it has on one side thereof a knob-like projection 5 with a corresponding recess and on the other side a similar knob-like projection 6 with a corresponding recess (Fig. 4), and by locating the projections 5 and 6 with their respective recesses symmetrically with respect to the center of the bridge, the staples can be nested in row formation as aforedescribed without regard to whether the forward side of one is adjacent the rearward side of another.

In place of knob-like or wave-like projections and recesses, the bridge may be deformed laterally in an arcuate shape as indicated at 7 (Fig. 5). This shape accomplishes the same purposes as aforementioned when the staples are assembled in row formation.

When providing the bridge portion of the staples with the various deformations previously described, dies of such characteristics may be used that the resulting outline of the projecting surface is the same as that of the recess. A snug fit is thus assured between the projections and recesses when a series of staples are assembled. On the other hand the deformations can be made by bending or by dies of such characteristics that the resulting outline of the projecting surface varies slightly from that of the recess. The staples when assembled in series will then have portions of the bridges thereof which are slightly spaced as indicated at 8, Fig. 6. When the adhesive is applied to a series of staples thus formed, it will to some extent fill up this space, thereby providing a better bond between the staples.

Staples with bridges deformed as above described can be used only in stapling machines which have ejection chutes and driving tools correspondingly and complementarily formed. With the driving tool deformed to correspond with the deformed bridge of the staple, it will be noted that the effective width of the driving engagement therebetween is increased. A more steady connection is thus maintained between the driving tool and the staple during the severing of the staple from the strip and during the driving thereof. With the ejection chute deformed to correspond with the bridge of the staple, there will be engagement between projecting portions of the staple and recessed portions of the ejection chute, which engagement will aid in preventing buckling or bending of the bridge of the staple during the driving thereof.

Referring now to the illustrative embodiments of the present invention as illustrated in Figs. 7 to 10, inclusive, 9 illustrates a strip of staples which do not require the use of adhesive to be maintained in strips. The bridge portion of each staple is shaped or cut to provide an interlock between preceding and succeeding adjacent staples. A frictional fit between the interlocking portions of adjacent staples holds the several staples in a strip. Contrary to the conventional strip formed from a continuous piece of metal, each staple does not have to be actually severed from the strip by cutting through the metal. It need only be released from its frictional interfit with the strip by the driving tool. The normal driving movement of the staple driven without appreciable additional manual effort is sufficient to release each staple from the strip.

The bridge of the staple may have a projecting lug 10 of dovetail shape and a similarly shaped slot or recess 11 so placed with respect to each other that when the lug of one staple is fitted in the slot of another staple, the staples will be held with their bridges and legs in alignment. The lugs and slots may be located centrally with respect to the bridge, as indicated in Fig. 10, or each staple may have a pair of such lugs and slots arranged symmetrically of the center, one of such lugs and slots being formed forwardly of the staple and the other rearwardly as illustrated in Fig. 7. The staples thus formed can be assembled without regard to whether they are positioned so as to face forwardly or rearwardly. It is proposed to form the lug and slot of arcuate shape as indicated at 12 and 13 (Fig. 8). With the lug and slot thus formed, the bridge and legs of the staple may be tapered and pointed as indicated at 14 and 15 (Fig. 9). The arcuate shape of the lugs and slots provides a ball and socket joint, and when pressure is brought to bear against the rear staple of a strip of such staples, the foremost staple, being pivotally related to the next succeeding staple, is permitted to properly align itself with respect to the ejection chute of a stapling machine.

Staples embodying the interfitting lock are customarily formed by being cut or stamped from a sheet of metal. This method is preferable to forming the staple from square or rectangular stock wire. It is to be noted that the embodiments illustrated in Figs. 7 to 10, inclusive, as well as providing for the elimination of the adhesive binder, also provide for all the advantages and functions enumerated above with reference to the embodiments illustrated in Figs. 1 to 6, inclusive. It is particularly stressed that the increase in the effective driving contact between the driving tool and the staple aids in preventing the staple legs from bending rearward and out of the vertical upon the staple being disconnected from the strip. In refilling a magazine which has been partially emptied, it is not necessary to interlock the new clip with the old clip.

As indicated by the embodiments illustrated in Figs. 10 to 13, inclusive, the legs of the staple may be provided with notches or nicks 16 (Fig. 10), with slight waves or deformations 17 (Fig. 11), with barbs 18 (Fig. 12) or with arrowhead points 19 (Fig. 13). All of these formations provide a burr-like or frictional surface on the staple legs which prevents their ready removal from material into which they are inserted. With the exception of barb 18, all the formations are of such dimensional characteristics that they do not disturb the fit of the staple in the magazine and ejection chute of a stapling machine. The barb 18 usually requires some modification to the construction of a stapling machine in which staples so formed are used. The waves or deformations 17 are slight enough so as to resist buckling of the leg during the driving action and yet sufficient to form a good frictional hold on the material into which the staple is driven.

As well as being deformed laterally or being provided with interlockable portions, as has been described, the bridge of the staple may be provided with depressed or elevated portion or portions, as illustrated in Figs. 14 to 16, inclusive. With the staples assembled in row or clip formation, and as so assembled, inserted into the magazine of a stapling machine, the pressure of the magazine follower or injector asserted against the last staple in a clip often causes intermediate staples to move vertically out of alignment and pile up one upon another. This is especially true of staples formed from round wire stock. By increasing the effective vertical surface area of the bridge of the staple, any moderate vertical misalignment, such as occurs within the dimensional tolerances of a magazine, will not be effective to permit the piling up of the staples. To this end the bridge of the staple is formed with a single centrally located and upwardly projecting portion 20 (Fig. 14), or with two such portions 21, 22 spaced and adjacent the legs of the staple (Fig. 15). In place of projecting upwardly, the portions may be depressed downwardly as illustrated at 21a and 22a (Fig. 16). The portions may also perform another function, that is, providing a lock and key method of preventing the insertion into a magazine of staples not designed for use therewith. To accommodate the depressed or elevated portions, the magazine must be shaped in complementary form. Hence, the staples cannot be inserted into a magazine of a machine which does not have the complementary shape. The user will then be protected from the jamming of his stapling machine due to the insertion therein of staples not properly designed for the particular machine.

It has previously been described how the bridge of a staple formed with lateral projections, deformations, or interlocking devices will coact with a similarly formed ejection chute to prevent buckling or bending thereof during the driving of the staple. Buckling and bending of the bridge results from the flow of the metal comprising the legs into the metal comprising the bridge. Any means which will prevent or resist this flow will prevent the buckling of the bridge. For example, the bridge of a staple having a specified tooth, notch, or aperture structure in the top side thereof, preferably adjacent the junction of the legs therewith, which structure is adapted to interfit with a complementarily formed structure on a driving tool, will not buckle during the driving action. The interfit of the bridge with the driving tool will resist the tendency of the metal comprising the legs to flow into the bridge portion. The embodiment of this means illustrated in Fig. 17 comprises an upwardly projecting protuberance 23 pressed out on the top of the bridge. The protuberance 23 is elongated and extends longitudinally of the bridge. It is preferably shaped to have an inverted V-shaped cross-section. The protuberance 23 is positioned substantially adjacent one end of the bridge. At the other end the bridge is provided with a depression or aperture 24 also slightly elongated and extending longitudinally of the bridge. When the staple is being driven by a staple driver having a complementary formed driving edge, the protuberance 23 enters in and engages with a complementally shaped recess in the tool, while a projection on the tool enters into the aperture 24.

The bridge of the staple may have formed therein adjacent each end one or a series of notches or teeth engageable with like notches or teeth formed on the driving tool. As indicated at 25 (Fig. 18) the teeth are sloped inwardly toward the center of the bridge. It has been found, however, that V-shaped notches 26 (Fig. 19) or a single notch 27 (Fig. 20) placed adjacent the ends of the bridge portion are also effective when engaged with similarly portioned notches or teeth on the driving tool to prevent buckling of the bridge. In order not to weaken the bridge, the notches and teeth may be raised therefrom, as indicated at 28 (Fig. 21), instead of formed therein. The bridge portion itself may be so formed that for each notch on the upper side there is a complementary tooth or protrusion in the underside and vice versa as illustrated at 29 (Fig. 22). Thus the necessary tooth and notch structure is formed without increasing or decreasing the cross-sectional area of the bridge. In all the modifications here described, it is preferable to form the single tooth or notch or the outermost tooth or notch of a series substantially in vertical alignment with the interior of the legs of the staple. By increasing the number of teeth or notches used, it is possible to make each individual tooth or notch of less depth and size.

It is to be understood that any one or all of the improvements herein described may be incorporated into staple strips whether the staples in such strips are cemented or adhesively secured or otherwise held together or whether the staples are made of square, round, flat or other shaped wire or cut from sheet metal. Any single improvement or group of improvements may be combined as is best suited for the conditions to be met.

What is claimed as new and is desired to be secured by Letters Patent of the United States is:

1. A staple adapted to be assembled in row formation with similar staples to form a clip, said staple being formed from wire stock and comprising a bridge with legs depending from the opposite ends thereof, said bridge comprising straight central and end portions lying along a common straight longitudinal axis, the sides of the bridge coextensive with said portions lying substantially in the same plane as the respective sides of the legs, said central portion being joined to each of said end portions by deformed portions, said deformed portions consisting of lateral knoblike projections and corresponding complementary aligned recesses, said projections extending beyond and said recesses receding from the sides of said bridge equidistantly.

2. A staple adapted to be assembled in row formation with similar staples to form a clip, said staple being formed from wire stock and comprising a bridge with legs depending from the opposite ends thereof, said bridge comprising straight central and end portions lying along a common straight longitudinal axis, said central portion being joined to each of said end portions by deformed portions, said deformed portions consisting of lateral knoblike projections and corresponding complementary aligned recesses, said projections extending beyond and said recesses receding from the sides of said bridge equidistantly, said deformed portions being located equidistant from the center of said bridge and being formed with said projections projecting from opposite sides thereof.

WILLIAM G. PANKONIN.